United States Patent
Messingher Lang et al.

(10) Patent No.: US 12,284,508 B2
(45) Date of Patent: Apr. 22, 2025

(54) VISUAL CONTENT PRESENTATION WITH VIEWER POSITION-BASED AUDIO

(71) Applicant: APPLE INC., Cupertino, CA (US)

(72) Inventors: Shai Messingher Lang, Santa Clara, CA (US); Alexandre Da Veiga, San Francisco, CA (US); Spencer H. Ray, San Jose, CA (US); Symeon Delikaris Manias, Playa Vista, CA (US)

(73) Assignee: Apple Inc., Cupertino, CA (US)

( * ) Notice: Subject to any disclaimer, the term of this patent is extended or adjusted under 35 U.S.C. 154(b) by 205 days.

(21) Appl. No.: 18/079,669

(22) Filed: Dec. 12, 2022

(65) Prior Publication Data

US 2023/0262406 A1 Aug. 17, 2023

Related U.S. Application Data

(63) Continuation of application No. PCT/US2021/035573, filed on Jun. 3, 2021.

(60) Provisional application No. 63/038,961, filed on Jun. 15, 2020.

(51) Int. Cl.
*H04S 7/00* (2006.01)
*G06F 3/01* (2006.01)
*H04S 3/00* (2006.01)

(52) U.S. Cl.
CPC .............. *H04S 7/303* (2013.01); *G06F 3/011* (2013.01); *H04S 3/008* (2013.01); *H04S 2400/01* (2013.01); *H04S 2400/11* (2013.01)

(58) Field of Classification Search
None
See application file for complete search history.

(56) References Cited

U.S. PATENT DOCUMENTS

2018/0332420 A1   11/2018   Salume et al.
2022/0092862 A1*   3/2022   Faulkner ................ G06V 40/10

OTHER PUBLICATIONS

International Search Report and Written Opinion of the International Searching Authority, International Application No. PCT/US2021/035573, 10 pages, Sep. 23, 2021.

* cited by examiner

*Primary Examiner* — Kenny H Truong
(74) *Attorney, Agent, or Firm* — Thompson Hine LLP

(57) ABSTRACT

Various implementations disclosed herein include devices, systems, and methods that display visual content as part of a 3D environment and add audio corresponding to the visual content. The audio may be spatialized to be from one or more audio source locations within the 3D environment. For example, a video may be presented on a virtual surface within an extended reality (XR) environment while audio associated with the video is spatialized to sound as if it is produced from an audio source location corresponding to that virtual surface. How the audio is provided may be determined based on the position of the viewer (e.g., the user or his/her device) relative to the presented visual content.

9 Claims, 7 Drawing Sheets

VISUAL CONTENT PRESENTATION WITH VIEWER POSITION-BASED AUDIO

CROSS-REFERENCE TO RELATED APPLICATIONS

This patent application is a continuation of International Application No. PCT/US2021/035573 filed on Jun. 3, 2021, which claims the benefit of U.S. Provisional Application No. 63/038,961 filed on Jun. 15, 2020, entitled "VISUAL CONTENT PRESENTATION WITH VIEWER POSITION-BASED AUDIO," each of which is incorporated herein by this reference in its entirety.

TECHNICAL FIELD

The present disclosure generally relates to techniques for providing visual and audio content.

BACKGROUND

Electronic devices present visual content such as images and videos and associated audio in different ways. For example, video content may be displayed on a display screen of a device while associated audio is played from one or more speakers on the device. The user experiences in which visual and audio content are provided may be improved.

SUMMARY

It is desirable to enable improved user content experiences. Various implementations disclosed herein include devices, systems, and methods that display visual content as part of a 3D environment and add audio corresponding to the visual content. The audio may be spatialized to be from one or more audio source locations within the 3D environment. For example, a video may be presented on a virtual surface within an extended reality (XR) environment while audio associated with the video is spatialized to sound as if it is produced from an audio source location corresponding to that virtual surface. How the audio is provided may be determined based on the position of the viewer (e.g., the user or his/her device) relative to the presented visual content. For example, a video may be presented on a surface that is portion of a sphere and, when viewed from outside the sphere, sound may be provided as if from a point source on the outside surface of the sphere. However, when the viewer moves his or her head inside the sphere, the viewer may be immersed in the audio, which may be spatialized on the sphere around the user.

In some implementations, a method is performed by a processor executing instructions. The method may involve determining a position in a three-dimensional (3D) environment to display visual content. The position may be on an interior or exterior surface of a virtual shape, such as on a portion of a virtual sphere. The visual content may be a video or distorted video, such as may be obtained from a fish eye camera or based on a lens characteristic. The visual content may be presented on a non-linear shape so the content is displayed without distortion. The method may involve determining a positional relationship (e.g., distance, orientation, etc.) of a viewer (user's head or device) relative to the visual content in the 3D environment. The positional relationship may be within or outside of a threshold distance from the visual content, within a sphere or other shape upon which the visual content is displayed, etc. The method may further involve determining an audio mode based on the positional relationship. As examples, the audio mode may be a point source audio mode, a stereo audio mode, a multi-channel audio mode, or a spatialized sound etc. The audio mode may define how to present audio content from different 3D positions. In one example, when a viewer is more than a threshold distance from visual content, a point source audio mode is used. In this example, when the viewer is within the threshold distance from the visual content but outside of a sphere or other virtual shape upon which the visual content is presented, a multi-channel audio mode is used. In this example, when the viewer is within the sphere other virtual shape upon which the visual content is presented, a spatialized audio mode is used. In some implementations, both a visual content display mode and the audio mode depend from and thus may vary based upon the positional relationship between a viewer and the visual content, e.g., a virtual object upon which the visual content is displayed.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
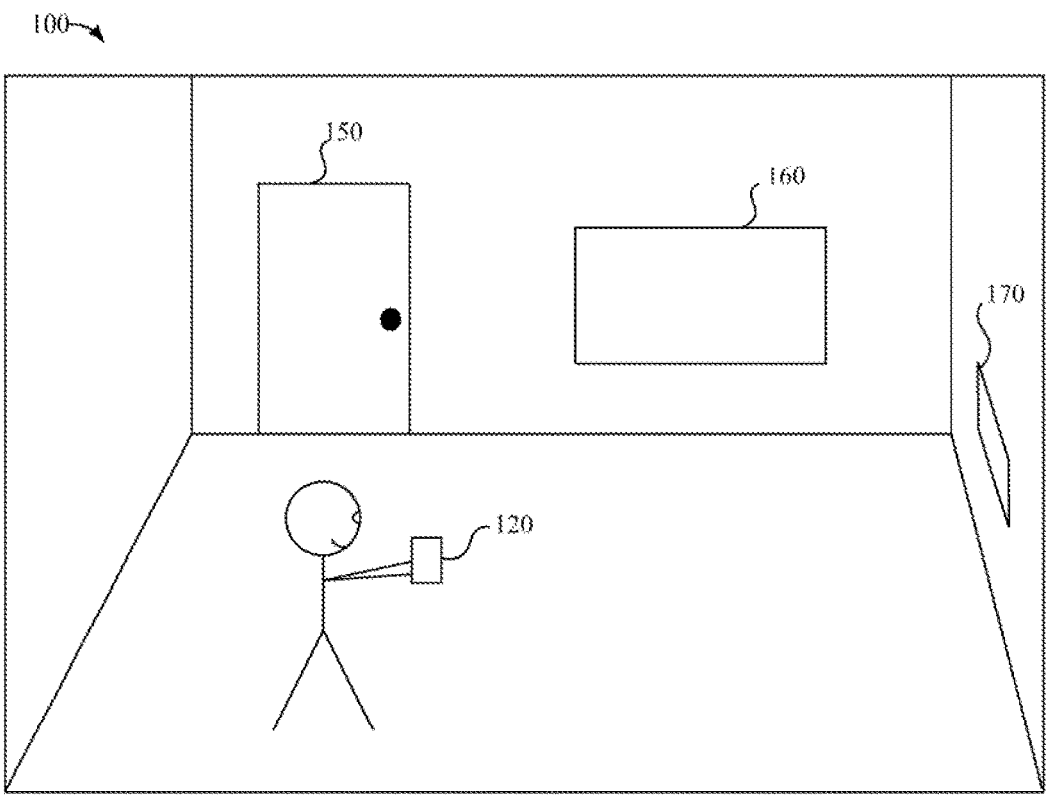
FIG. 1 illustrates an exemplary electronic device operating in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary electronic device 120 operating in a physical environment 100 in accordance with some implementations. The physical environment 100 includes a door 150, a window 160, and a wall hanging 170. The electronic device 120 includes one or more cameras or other sensors that can be used to capture or generate representations of the door 150, the window 160, the wall hanging 170, and other objects of the physical environment 100.

Figure 2:
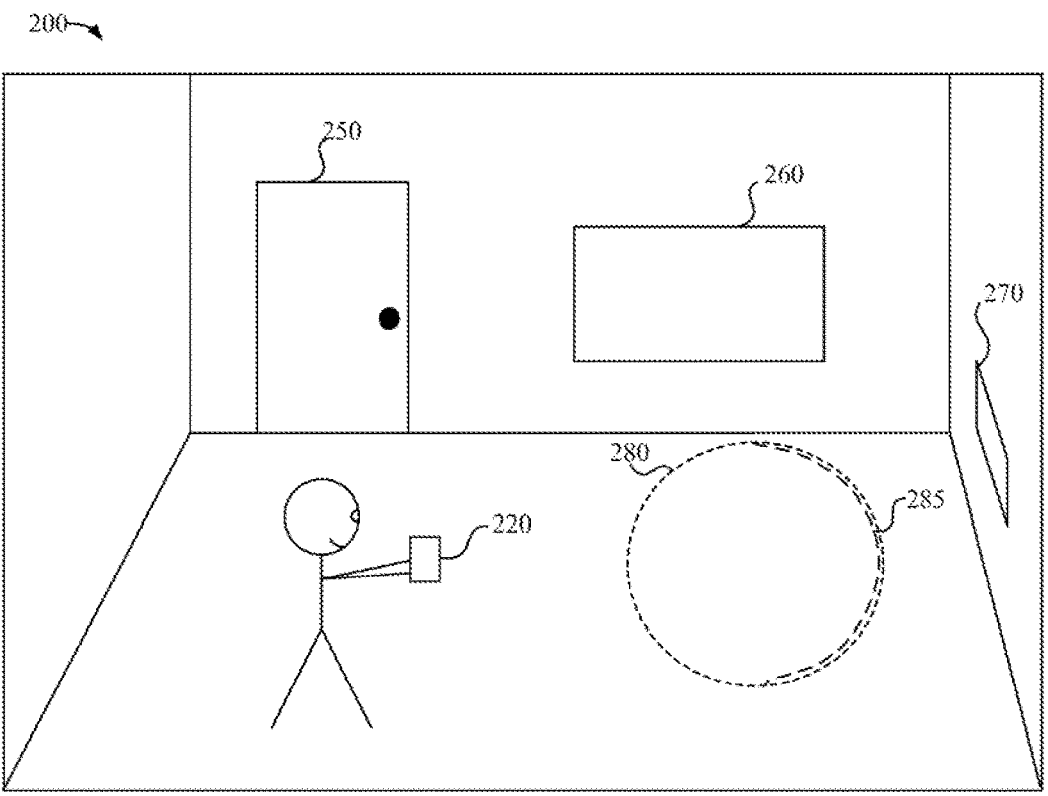
FIG. 2 illustrates an exemplary three-dimensional environment generated based on the physical environment of FIG. 1.

FIG. 2 illustrates an exemplary three-dimensional 3D environment 200 generated based on the physical environment 100 of FIG. 1. The 3D environment 200 includes representations 250, 260, 270 of the door 150, window 160, and wall hanging 170, respectively, of the physical environment 100. The 3D environment 200 also includes visual content 285 that is displayed on a surface of a virtual shape 280 (e.g., a 3D virtual shape). The electronic device 120 provides views of the 3D environment 200 that include depictions of the 3D environment from a viewer position 220, which in this example is determined based on the position of the electronic device 120 in the physical environment 100. Thus, as the user moves the electronic device 120 relative to the physical environment 100, the viewer position 220 corresponding the electronic device 120 position is moved relative to the 3D environment 200. The view of the 3D environment provided by the electronic device changes based on changes to the viewer position 220 relative to the 3D environment 200. In some implementations, the 3D environment 200 does not include representations of the physical environment 100, for example, including only virtual content corresponding to a virtual reality environment.

In the example of FIGS. 1 and 2, the electronic device 120 is illustrated as a single, hand-held device. The electronic device 120 may be a mobile phone, a tablet, a laptop, so forth. In some implementations, electronic device 120 is worn by a user. For example, electronic device 120 may be a watch, a head-mounted device (HMD), head-worn device (glasses), headphones, an ear mounted device, and so forth. In some implementations, functions of the device 120 are accomplished via two or more devices, for example a mobile device and base station or a head mounted display and an ear mounted device. Various capabilities may be distributed amongst multiple device, including, but not limited to power capabilities, CPU capabilities, GPU capabilities, storage capabilities, memory capabilities, visual content display capabilities, audio content production capabilities, and the like. The multiple devices that may be used to accomplish the functions of electronic device 120 may communicate with one another via wired or wireless communications.

According to some implementations, the electronic device 120 generates and presents an extended reality (XR) environment to one or more users. An extended reality (XR) environment refers to a wholly or partially simulated environment that someone may interact with and/or sense using an electronic device. For example, an XR environment may include virtual reality (VR) content, augmented reality (AR) content, mixed reality (MR) content, or the like. Using an XR system, a portion of a person's physical motions, or representations thereof, may be tracked. In response, one or more characteristics of a virtual object simulated in the XR environment may be adjusted such that it adheres to one or more laws of physics. For example, the XR system may detect a user's movement and, in response, adjust graphical and auditory content presented to the user in a way similar to how views and sounds would change in a physical environment. In another example, the XR system may detect movement of an electronic device presenting an XR environment (e.g., a laptop, a mobile phone, a tablet, or the like) and, in response, adjust graphical and auditory content presented to the user in a way similar to how views and sounds would change in a physical environment. In some situations, the XR system may adjust one or more characteristics of graphical content in the XR environment responsive to a representation of a physical motion (e.g., a vocal command).

Various electronic systems enable one to interact with and/or sense XR environments. For example, projection-based systems, head-mountable systems, heads-up displays (HUDs), windows having integrated displays, vehicle windshields having integrated displays, displays designed to be placed on a user's eyes (e.g., similar to contact lenses), speaker arrays, headphones/earphones, input systems (e.g., wearable or handheld controllers with or without haptic feedback), tablets, smartphones, and desktop/laptop computers may be used. A head-mountable system may include an integrated opaque display and one or more speakers. In other examples, a head-mountable system may accept an external device having an opaque display (e.g., a smartphone). The head-mountable system may include one or more image sensors and/or one or more microphones to capture images or video and/or audio of the physical environment. In other examples, a head-mountable system may include a transparent or translucent display. A medium through which light representative of images is directed may be included within the transparent or translucent display. The display may utilize OLEDs, LEDs, uLEDs, digital light projection, laser scanning light source, liquid crystal on silicon, or any combination of these technologies. The medium may be a hologram medium, an optical combiner, an optical waveguide, an optical reflector, or a combination thereof. In some examples, the transparent or translucent display may be configured to selectively become opaque. Projection-based systems may use retinal projection technology to project graphical images onto a user's retina. Projection systems may also be configured to project virtual objects into the physical environment, for example, on a physical surface or as a hologram.

Figure 3:
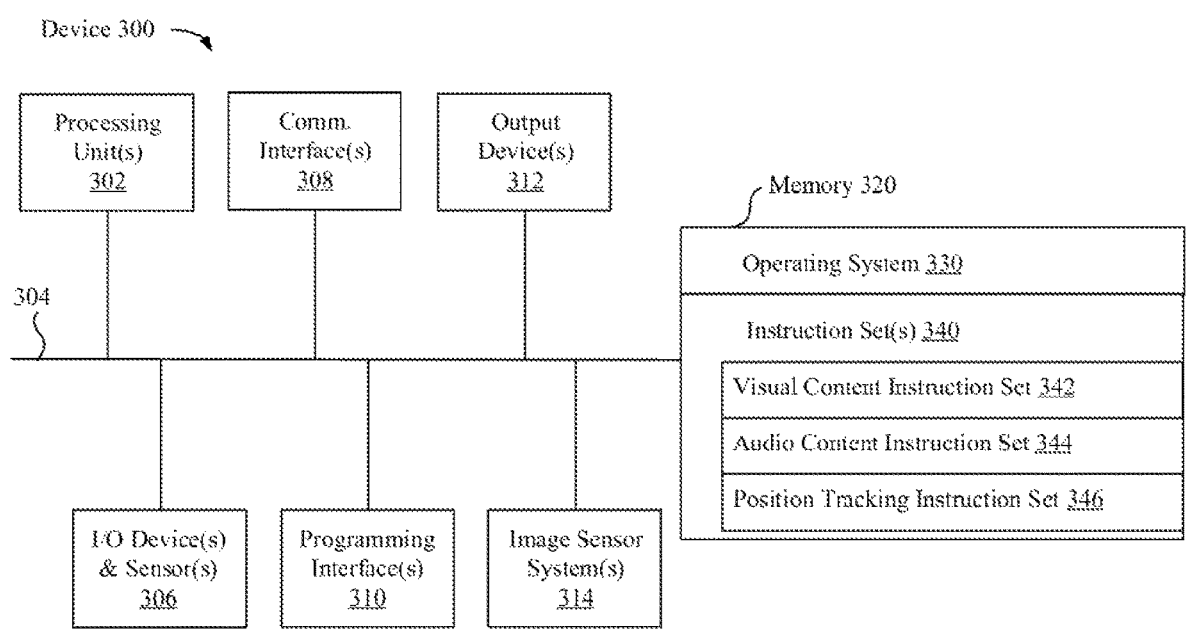
FIG. 3 is a block diagram of an exemplary device in accordance with some implementations.

FIG. 3 is a block diagram of an example device 300. Device 300 illustrates an exemplary device configuration for electronic device 120. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 300 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 310, one or more output device(s) 312, one or more interior and/or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 312 include one or more displays configured to present a view of a 3D environment to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 300 includes a single display. In another example, the device 300 includes a display for each eye of the user.

In some implementations, the one or more output device(s) 312 include one or more audio producing devices. In some implementations, the one or more output device(s) 312 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations.

In some implementations, the one or more image sensor systems 314 are configured to obtain image data that corresponds to at least a portion of the physical environment 100. For example, the one or more image sensor systems 314 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 314 further include illumination sources that emit light, such as a flash. In various implementations, the one or more image sensor systems 314 further include an on-camera image signal processor (ISP) configured to execute a plurality of processing operations on the image data.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium.

In some implementations, the memory 320 or the non-transitory computer readable storage medium of the memory 320 stores an optional operating system 330 and one or more instruction set(s) 340. The operating system 330 includes procedures for handling various basic system services and for performing hardware dependent tasks. In some implementations, the instruction set(s) 340 include executable software defined by binary information stored in the form of electrical charge. In some implementations, the instruction set(s) 340 are software that is executable by the one or more processing units 302 to carry out one or more of the techniques described herein.

The instruction set(s) 340 include a visual content instruction set 342, an audio content instruction set 344, and a position tracking instruction set 346. The instruction set(s) 340 may be embodied as a single software executable or multiple software executables.

The visual content instruction set 342 is executable by the processing unit(s) 302 to provide visual content such as one or more images, video, animation, and the like. In some implementations, the visual content instruction set 342 is executed to generate a 3D environment, include visual content in the 3D environment, and provide views of the 3D environment including the visual content based on a viewer position. The viewer position may be determined according to the position tracking instruction set 346 and may be based on a viewer (e.g., user or device) position and movement in a physical environment. In some implementations, the visual content instruction set 342 is executed to include visual content on a real or virtual surface in a 3D environment and provide views of the 3D environment including the visual content on the surface based on a viewer position. The real or virtual surface may correspond to a shape, e.g., a flat plane, a portion of a sphere, a shape that corresponds to image content from which the visual content is created, etc.

The audio content instruction set 344 is executable by the processing unit(s) 302 to provide audio content that corresponds to visual content provided according to the visual content instruction set 342. In some implementations, the visual content instruction set 342 is executed to determine how to present audio content based on a viewer position. The viewer position may be determined according to the position tracking instruction set 346 and may be based on a viewer (e.g., user or device) position and movement in a physical environment. In some implementations, audio content instruction set 344 is executed to determine an audio content mode (e.g., single point source, multiple point source, audio source location(s), etc.) based on the viewer position, e.g., the viewer position relative to a position at which the visual content is displayed within the 3D environment. In some implementations, audio content is provided in a mode that depends upon whether the viewer position is within a predetermined distance of the visual content or within a virtual shape corresponding to the virtual content. Additional techniques and examples of providing audio content based on viewer position are discussed with reference to FIGS. 4-7 herein.

The position tracking instruction set 346 is executable by the processing unit(s) 302 to track a position of a viewer (e.g., the user or his/her device) relative to a 3D environment. This may involve tracking a position or movement of the viewer in a physical environment. Position, including 2D or 3D coordinate information or orientation, may be tracked based on information from I/O device(s) and sensor(s) 306 or image sensor(s) 314. In some implementations, the position tracking instruction set 346 is executed to evaluate images of a physical environment, recognize objects in the physical environment, and determine a viewer position relative to the objects in the physical environment. In some implementations, the viewer position is additionally or alternatively tracked using an inertial measurement unit (IMU), an accelerometer, a magnetometer, or a gyroscope. In some implementations, a visual inertial odometry (VIO) technique or a simultaneous localization and mapping (SLAM) technique is applied to track viewer position. In some implementations, position tracking instruction set 346 implements a machine learning model that uses image data or sensor data to track viewer position.

Although the instruction set(s) 340 are shown as residing on a single device, it should be understood that in other implementations, any combination of the elements may be located in separate computing devices. Moreover, FIG. 3 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 4:
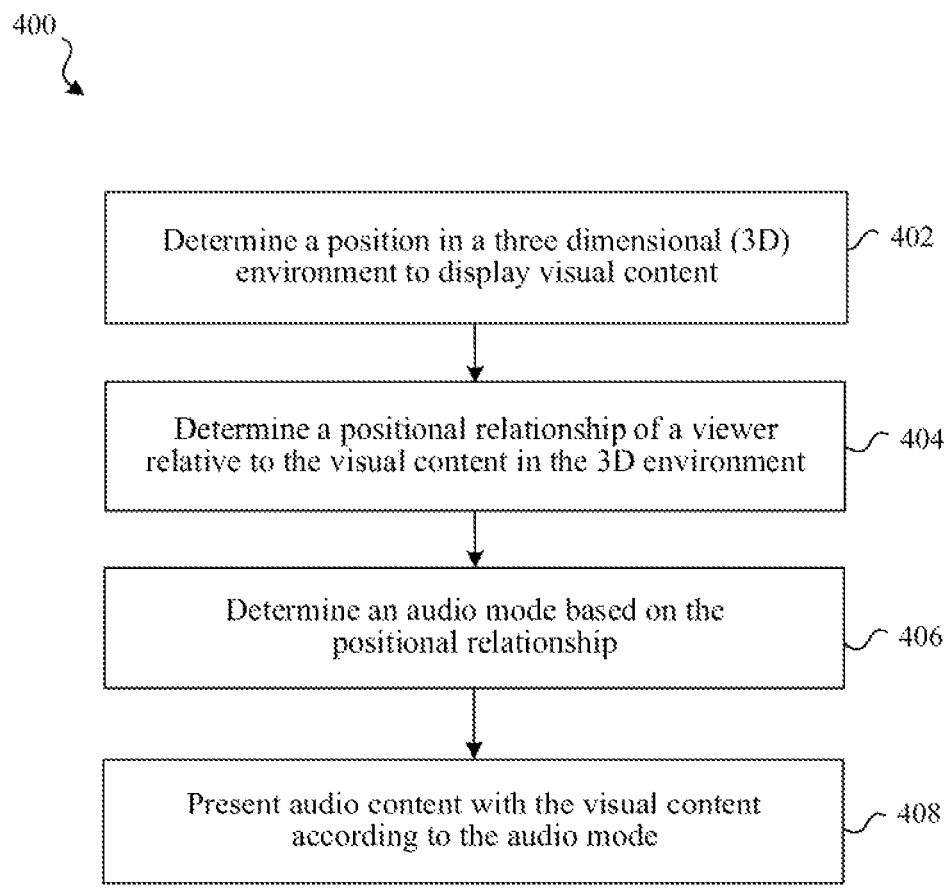
FIG. 4 is a flowchart illustrating a method for visual content presentation with viewer position-based audio in accordance with some implementations.

FIG. 4 is a flowchart illustrating an exemplary method 400. In some implementations, a device such as electronic device 120 (FIG. 1) performs the techniques of method 400 to present visual content with viewer position-based audio. In some implementations, the techniques of method 400 are performed on a mobile device, desktop, laptop, HMD, ear-mounted device or server device. In some implementations, the method 400 is performed by processing logic, including hardware, firmware, software, or a combination thereof. In some implementations, the method 400 is performed on a processor executing code stored in a non-transitory computer-readable medium (e.g., a memory).

At block 402, the method 400 determines a position in a 3D environment to display visual content. The visual content may be one or more images, a video, an animation or other visible content that is recorded or created. The visual content may include 2D or 3D content. The visual content may be non-linear content captured from a camera such as a camera with a fish eye lens. Such a camera may capture non-linear content corresponding to the shape of the lens without flattening the content and this non-linear content may be positioned in a 3D environment, e.g., on a corresponding non-linear surface without adjustment. For example, the content may be displayed on a portion of an inside or outside of an approximately spherical shape (which may be invisible). Non-linear visual content may be captured and displayed without distortion or adjustment that would otherwise be used to present the content on a planar surface. The 3D environment may be any type of environment including XR environments that include representations of real or virtual objects.

At block 404, the method 400 determines a positional relationship (e.g., distance, orientation, etc.) of a viewer (e.g., a user's head or device) relative to the visual content in the 3D environment. In some implementations, determining the positional relationship involves determining that the viewer is within a predetermined distance of the visual content. In some implementations, determining the positional relationship involves determining that the viewer is within an area associated with the visual content. The positional relationship may be within or outside of a threshold distance from the visual content, within a sphere determined based on the visual content, etc. In some implementations, the position of a viewer is tracked over time while visual content is presented in the 3D environment. Thus, as the viewer moves within the environment or the visual content moves within the environment, the relative positioning between the viewer and visual content is tracked, e.g., at each frame or instant in time, every 5 frames or instants in time, etc.

At block 406, the method 400 determines an audio mode based on the positional relationship and, at block 408, the method 400 presents the audio content with the visual content according to the audio mode. The audio mode may specify a single point source at a particular location, e.g., at the center of the visual content, multiple point sources at particular locations, spatialized sound at one or more point sources in a 3D environment, a multi-channel audio mode identifying point sources for different audio channels, etc. In one example, different audio channels are provided from different point source locations. The audio mode may involve rendering audio from a plurality of positions on a shape upon which the visual content is displayed. The audio mode may be to present different audio content from different 3D positions based on associations with the audio content with particular visual content items. In an example, different sounds are provided from different point source locations. For example, the visual content may include a bird and a clock and the audio mode may specify that the different sounds associated with each of these different objects be provided as if from positions at which each of the displayed objects appears within the 3D environment, e.g., at the respective points on the surface upon which the visual content is being presented. As the bird appears to fly across the shape (e.g., the image of the bird moves within a video), the sounds associated with bird are positioned accordingly (e.g., at positions on the image corresponding to the bird's current position at the different points in time during the movement).

Audio content may have been recorded or created at the same time as visual content. Audio content may be stored with (e.g., on the same medium or file or project) visual content with which it is associated. The association between audio content may be determined based on express or inferred associations determined based on when and where the content was created, how it is stored, identifiers used to associate the content, manual associations, or otherwise. In some implementations, metadata associates particular audio content items with particular portions of visual content. For example, visual content may be semantically segmented to identify semantic labels for different portions (e.g., pixels) and audio content may be semantically labelled to identify semantic labels for different audio portion. The semantic labels may be used to provide spatialized audio at locations that correspond to particular visual content items, e.g., bird sounds at the locations of birds, water sounds at the location of water, etc.

The audio mode may specify an amount or level of spatialization. In one example, the amount or level of spatialization depends upon the positional relationship of the viewer to the visual content. For example, audio spatialization may increase based on detecting the viewer approaching the visual content. When far away from the visual content, all sound may be provided as if from a single source but as the user approaches the number of sources may incrementally increase as distance decreases.

Figure 5A:
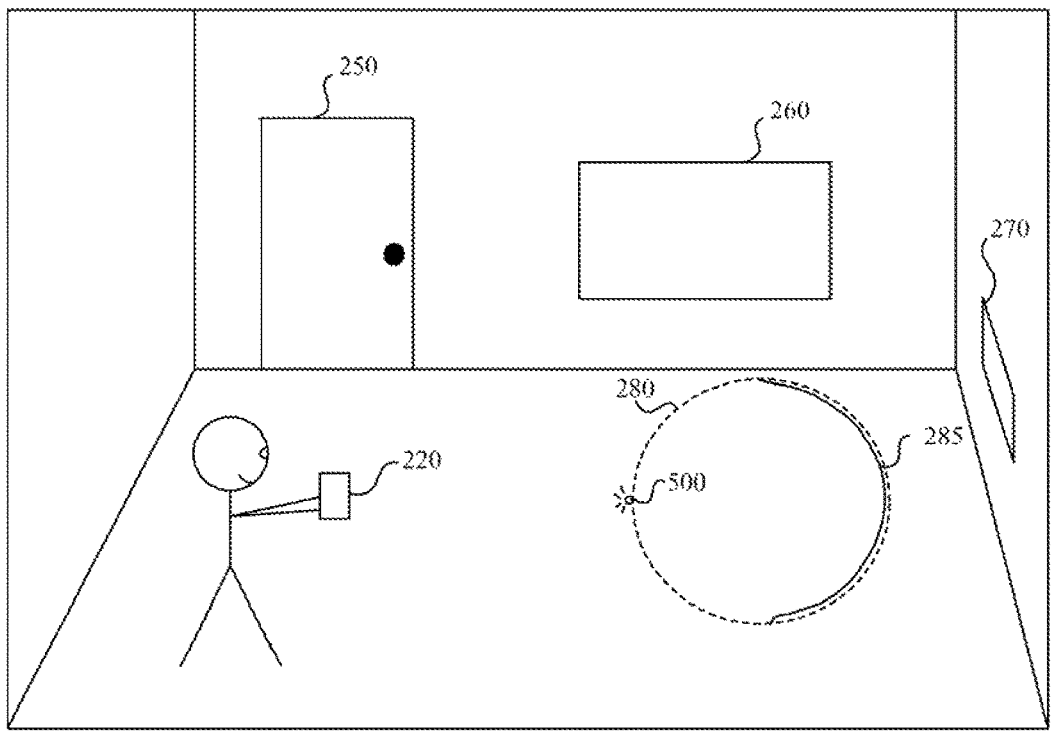
FIGS. 5A-B illustrate providing audio according to an audio mode selected based on viewer position in accordance with some implementations.

FIG. 5A illustrates providing audio according to an audio mode selected based on viewer position. In this example, the visual content 285 is positioned on a surface of a virtual shape 280. A positional relationship between the viewer position 220 and the visual content 285 is determined. In this example, the viewer position 220 is determined to be more than a threshold distance from the visual content 285 and outside of the virtual shape 280. Based on this positional relationship, a single point source audio mode is selected, e.g., selecting a point 500 on the outer surface of the virtual shape 280 from which to provide the sound associated with the visual content. The sound may be provided from that point, for example, using a spatialized audio technique. While shown on the surface of virtual shape 280 in FIG. 5, in other examples, point 500 can be located within the virtual shape 280 (e.g., at the center of virtual shape 280) or on the same surface as visual content 285.

Figure 5B:
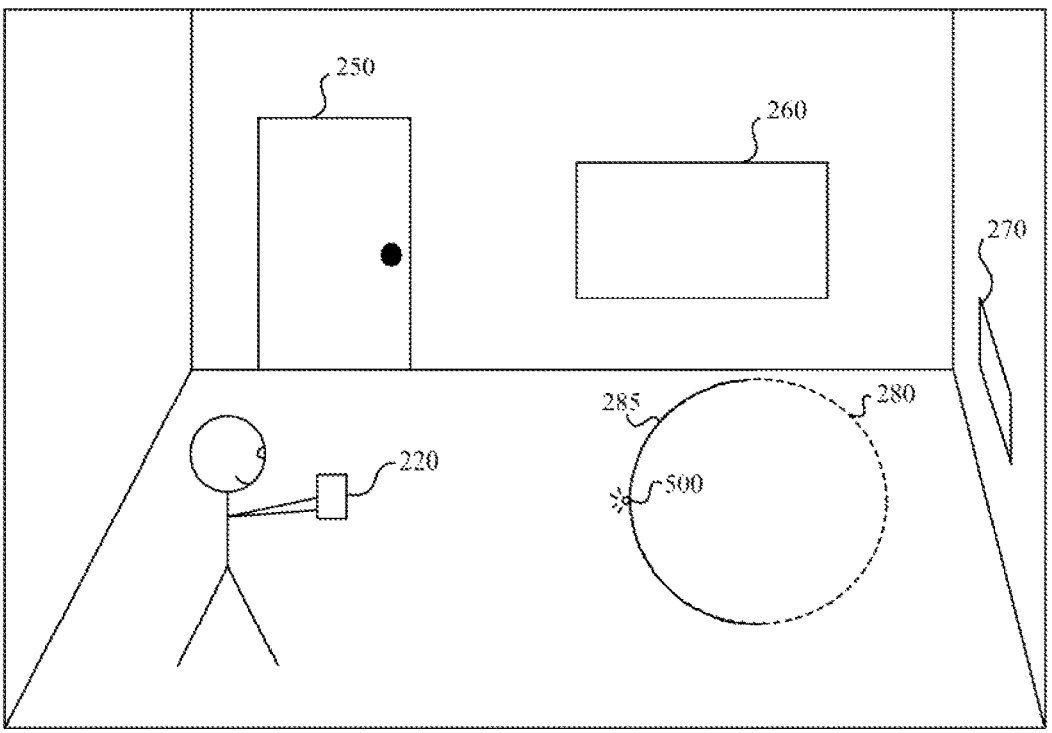

As shown in FIG. 5A, the visual content 285 is positioned on an inner surface of a portion of virtual shape 280 away from viewer position 220. However, it should be appreciated that in other examples, as illustrated in FIG. 5B, visual content 285 can be positioned on an outer surface of a portion of virtual shape 280 towards viewer position 220. In some examples, the amount of surface occupied by visual content 285 can depend on an amount of visual content (e.g., image, video, animation, or the like) that is represented by visual content 285 (e.g., a field of view of an image, video, or animation being shown).

In some examples, the audio point source may have a non-omnidirectional directivity. In these examples, the audio point source can be directed inward or outward from the virtual shape 280 (e.g., outward from the center of virtual shape 280) based on the location of point 500. For example, the audio point source can be directed outward when point 500 is located within virtual shape 280 or on a surface of virtual shape 280 toward the user, but can be directed inward when located on a surface of virtual shape 280 away from the user. In other examples, the audio point source can be directed outward when viewer position 220 is outside the area or volume defined by virtual shape 280.

Figure 6A:
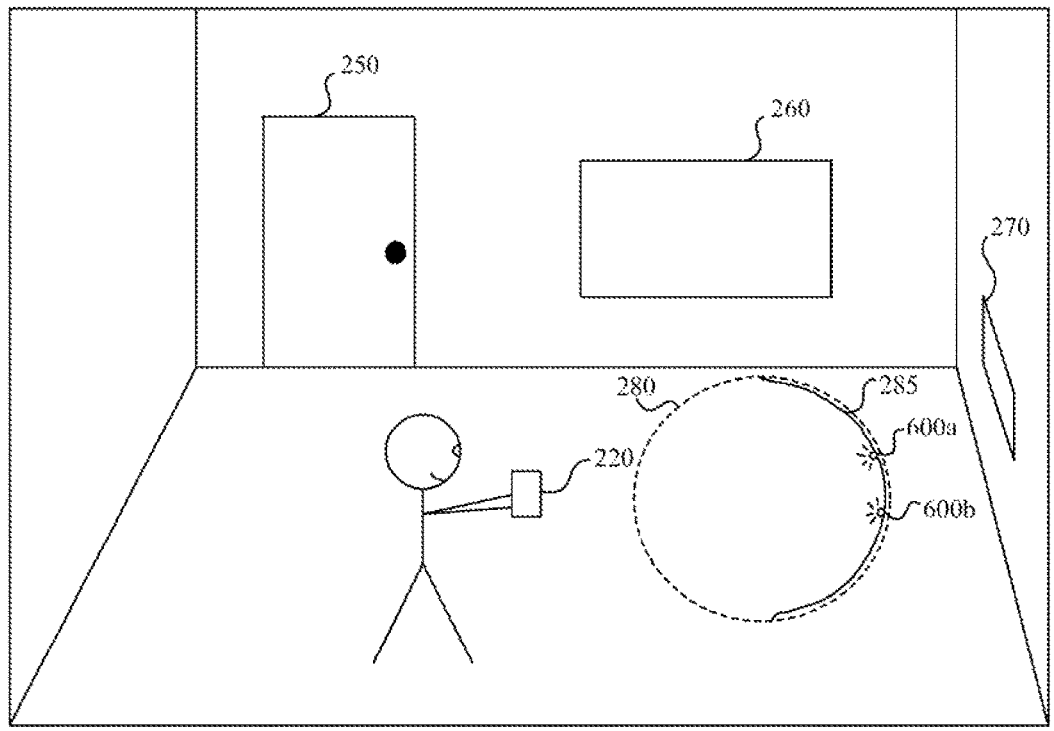
FIGS. 6A-B illustrate providing audio according to another audio mode selected based on viewer position in accordance with some implementations.

FIG. 6A illustrates providing audio according to another audio mode selected based on viewer position. In this example, the visual content 285 is positioned on a surface of the virtual shape 280 and a different positional relationship between the viewer position 220 and the visual content 285 is determined. In this example, the viewer position 220 is determined to be outside of an area defined by the virtual shape 280 but within a threshold distance of the visual content 285. Based on this positional relationship, a multi-point (e.g., a two-point) source audio mode is selected, e.g., selecting two points 600*a-b* on the surface of the virtual shape 280 from which to provide the sound associated with the visual content. The sound may be provided from those points, for example, using a spatialized audio technique. While shown on the surface of virtual shape 280 in FIG. 6, in other examples, point 500 can be located within the virtual shape 280 (e.g., at the center of virtual shape 280) or on a different surface than visual content 285.

Figure 6B:
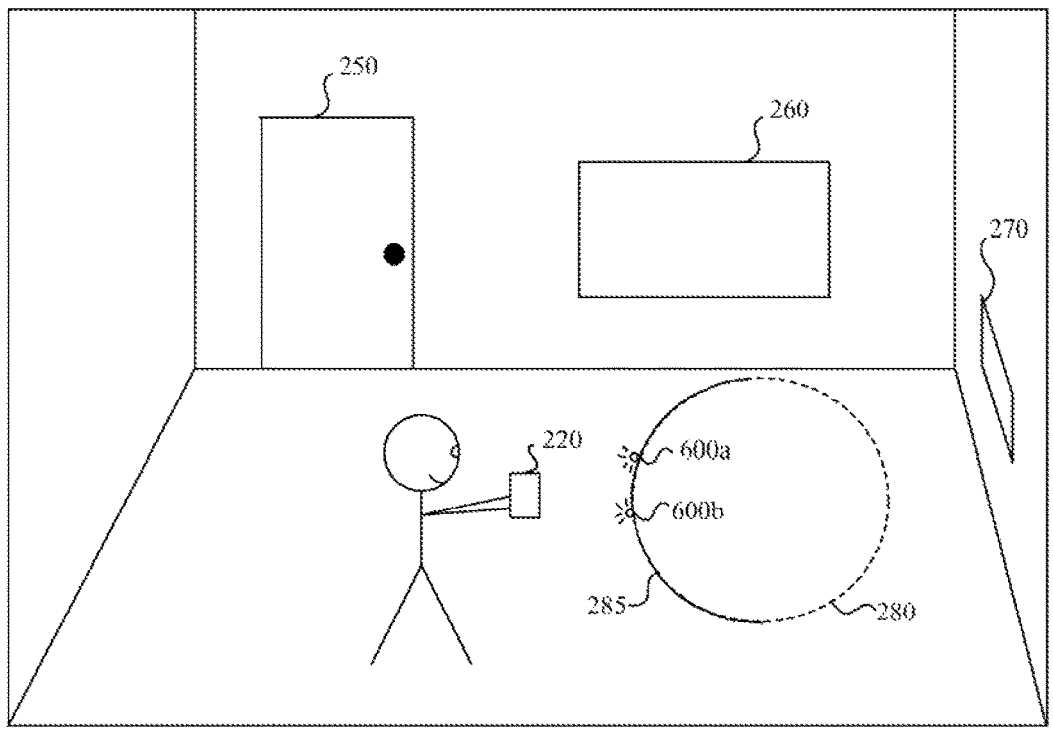

As mentioned above with respect to FIG. 5A and illustrated in FIG. 6A, the visual content 285 is positioned on an inner surface of a portion of virtual shape 280 away from viewer position 220. However, it should be appreciated that in other examples, as illustrated in FIG. 6B, visual content 285 can be positioned on an outer surface of a portion of virtual shape 280 towards viewer position 220. The two points 600*a-b* selected on the surface of the virtual shape 280 may correspond to the positioning of the visual content 285 on the virtual shape 280. In some examples, the amount of surface occupied by visual content 285 can depend on an amount of visual content (e.g., image, video, animation, or the like) that is represented by visual content 285 (e.g., a field of view of an image, video, or animation being shown).

In some examples, the audio point sources may have a non-omnidirectional directivity. In these examples, the audio point sources can be directed inward or outward from the virtual shape 280 (e.g., outward from the center of virtual shape 280) based on the location of point 500. For example, the audio point source can be directed outward when point 500 is located within virtual shape 280 or on a surface of virtual shape 280 toward the user, but can be directed inward when located on a surface of virtual shape 280 away from the user. In other examples, the audio point sources can be directed outward when viewer position 220 is outside the area or volume defined by virtual shape 280.

Figure 7:
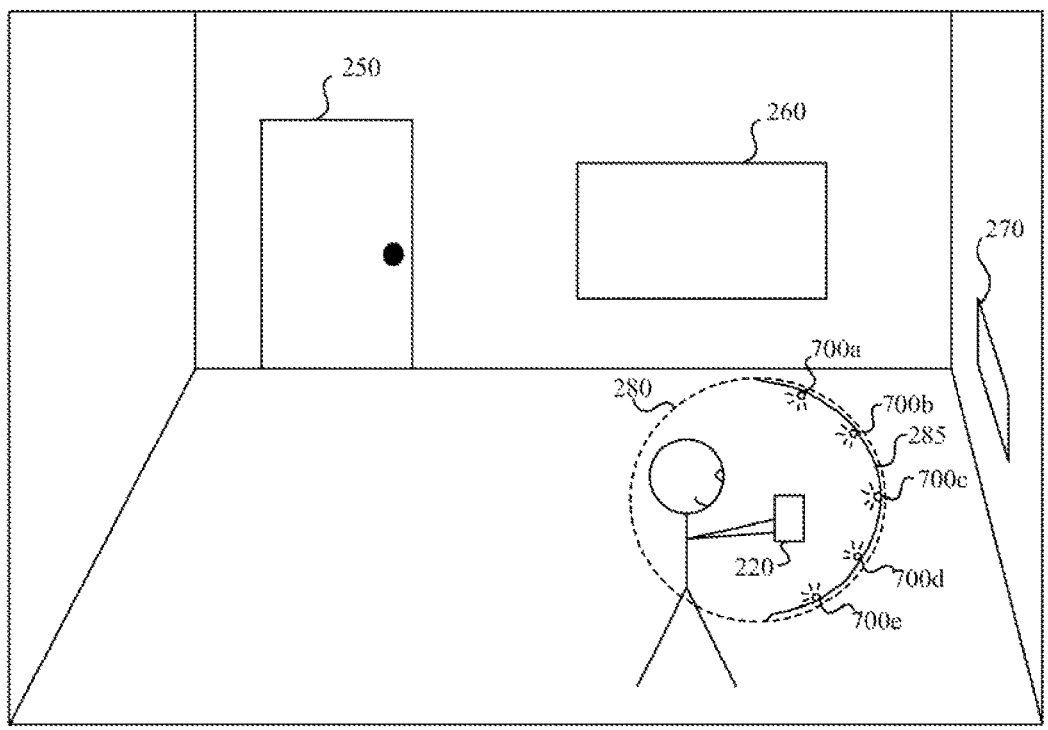
FIG. 7 illustrates providing audio according to another audio mode selected based on viewer position in accordance with some implementations.

FIG. 7 illustrates providing audio according to another audio mode selected based on viewer position. In this example, the visual content 285 is positioned on the surface of the virtual shape 280 and a different positional relationship between the viewer position 220 and the visual content 285 is determined. In this example, the viewer position 220 is determined to be inside of an area or volume defined by the virtual shape 280. Based on this positional relationship, a multiple point source audio mode is selected, e.g., selecting multiple points 700*a-e* on the surface of the virtual shape 280 from which to provide the sound associated with the visual content. The sound may be provided from those points, for example, using a spatialized audio technique.

In some examples where visual content 285 was previously displayed on an outer surface of virtual shape 280 when viewer position 220 was outside an area or volume defined by virtual shape 280, the visual content 285 can be transitioned to an inner surface of virtual shape 280 when viewer position 220 enters the area or volume defined by virtual shape 280. In some examples, the portion of virtual shape 280 on which the visual content 285 is presented can change based on whether viewer position 220 is within an area or volume defined by virtual shape 280. For example, when viewer position 220 is outside of virtual shape 280, the visual content 285 can be presented on an outer surface of a front portion of virtual shape 285 toward viewer position 220. However, when viewer position 220 transitions to an area or volume defined by virtual shape 280, the visual content 285 can be presented on an inner surface of a back portion of virtual shape 285 away from the previous viewer position (or inner surface of a portion of virtual shape 285 opposite the previous presentation portion). In some examples, the amount of surface occupied by visual content 285 can depend on an amount of visual content (e.g., image, video, animation, or the like) that is represented by visual content 285 (e.g., a field of view of an image, video, or animation being shown).

In some examples, the audio point sources may have a non-omnidirectional directivity. In these examples, the audio point sources can be directed inward when viewer position 220 is within the area or volume defined by virtual shape 280.

Figure 8:
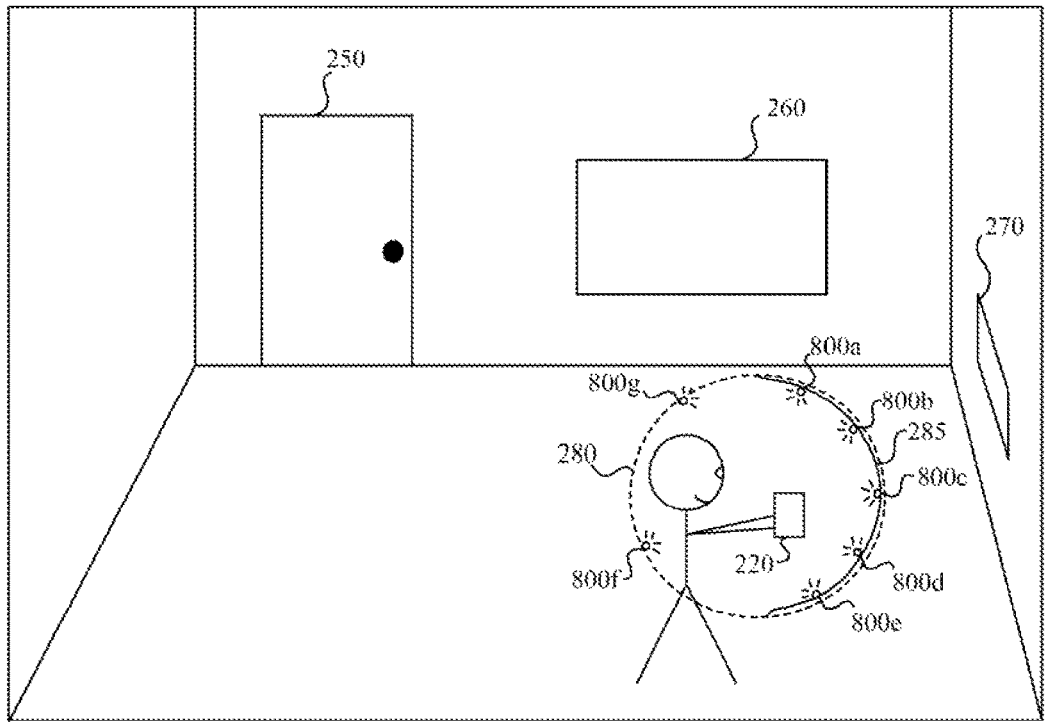
FIG. 8 illustrates providing audio according to another audio mode selected based on viewer position in accordance with some implementations.

FIG. 8 illustrates providing audio according to another audio mode selected based on viewer position. In this example, the viewer position 220 is determined to be inside of an area or volume defined by the virtual shape 280. Based on this positional relationship, a surround audio mode is selected, e.g., selecting multiple points 800*a-g* on the surface of the virtual shape 280, some of which are not on the portion of the surface upon which the visual content is displayed, from which to provide the sound associated with the visual content.

Similar to FIG. 7, in some examples where visual content 285 was previously displayed on an outer surface of virtual shape 280 when viewer position 220 was outside an area or volume defined by virtual shape 280, the visual content 285 can be transitioned to an inner surface of virtual shape 280 when viewer position 220 enters the area or volume defined by virtual shape 280. In some examples, the portion of virtual shape 280 on which the visual content 285 is presented can change based on whether viewer position 220 is within an area or volume defined by virtual shape 280. For example, when viewer position 220 is outside of virtual shape 280, the visual content 285 can be presented on an outer surface of a front portion of virtual shape 285 toward viewer position 220. However, when viewer position 220 transitions to an area or volume defined by virtual shape 280, the visual content 285 can be presented on an inner surface of a back portion of virtual shape 285 away from the previous viewer position (or inner surface of a portion of virtual shape 285 opposite the previous presentation portion). In some examples, the amount of surface occupied by visual content 285 can depend on an amount of visual content (e.g., image, video, animation, or the like) that is represented by visual content 285 (e.g., a field of view of an image, video, or animation being shown).

In some examples, the audio point sources may have a non-omnidirectional directivity. In these examples, the audio point sources can be directed inward when viewer position 220 is within the area or volume defined by virtual shape 280.

Figure 9:
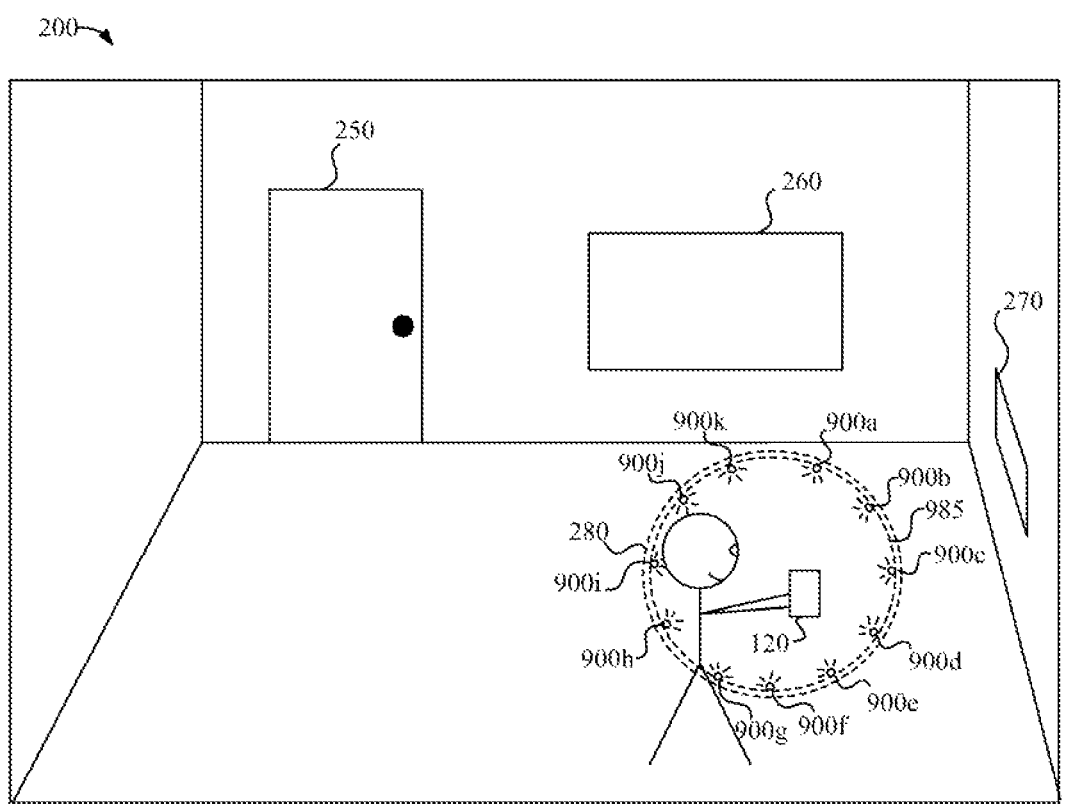
FIG. 9 illustrates providing video and audio based on viewer position in accordance with some implementations.

FIG. 9 illustrates providing video and audio based on viewer position in accordance with some implementations. In this example, the viewer position 220 is determined to be inside of an area defined by the virtual shape 280. Based on this positional relationship, a surround audio-visual mode is selected, e.g., providing expanded visual content 985 in the user's view and selecting multiple points 900a-k on the surface of the virtual shape 280 from which to provide the sound associated with the visual content. As illustrated in this example, the visual content may change according to a visual content mode based on viewer position. For example, based on the viewer position 220 being inside of an area defined by the virtual shape 280, the visual content may expand to occupy additional portions or all of the virtual shape 280, e.g., surrounding or enveloping the viewer.

Similar to FIGS. 7 and 8, in some examples where visual content 285 was previously displayed on an outer surface of virtual shape 280 when viewer position 220 was outside an area or volume defined by virtual shape 280, the visual content 285 can be transitioned to an inner surface of virtual shape 280 when viewer position 220 enters the area or volume defined by virtual shape 280. In some examples, the portion of virtual shape 280 on which the visual content 285 is presented can change based on whether viewer position 220 is within an area or volume defined by virtual shape 280. For example, when viewer position 220 is outside of virtual shape 280, the visual content 285 can be presented on an outer surface of a front portion of virtual shape 285 toward viewer position 220. However, when viewer position 220 transitions to an area or volume defined by virtual shape 280, the visual content 285 can be presented on an inner surface of a back portion of virtual shape 285 away from the previous viewer position (or inner surface of a portion of virtual shape 285 opposite the previous presentation portion).

In some examples, the audio point sources may have a non-omnidirectional directivity. In these examples, the audio point sources can be directed inward when viewer position 220 is within the area or volume defined by virtual shape 280.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a device having a processor:
      determining a position in a three-dimensional (3D) environment to display visual content;
      determining a positional relationship of a viewer relative to the visual content in the 3D environment, wherein the positional relationship comprises a distance of the viewer from the visual content;
      determining an audio mode based on the positional relationship, wherein the audio mode is a single point source audio mode and wherein the single point source audio mode is selected based on the distance exceeding a threshold; and
   presenting audio content with the visual content according to the audio mode.

2. The method of claim 1, wherein a position of the point source is determined based on the position of the visual content.

3. A method comprising:
   at a device having a processor:
      determining a position in a three-dimensional (3D) environment to display visual content;
      determining a positional relationship of a viewer relative to the visual content in the 3D environment, wherein the positional relationship comprises the viewer being located outside of a shape associated with the visual content;
      determining an audio mode based on the positional relationship, wherein the audio mode is a single point source audio mode and wherein the single point source audio mode is selected based on the viewer being located outside of the shape; and
   presenting audio content with the visual content according to the audio mode.

4. A method comprising:
   at a device having a processor:
      determining a position in a three-dimensional (3D) environment to display visual content;
   determining a positional relationship of a viewer relative to the visual content in the 3D environment, wherein the positional relationship comprises a distance of the viewer from the visual content;
      determining an audio mode based on the positional relationship, wherein the audio mode is a multi-channel audio mode, wherein the multi-channel audio mode is selected based on the distance being less than a threshold; and
   presenting audio content with the visual content according to the audio mode.

5. A method comprising:
   at a device having a processor:
      determining a position in a three-dimensional (3D) environment to display visual content;
      determining a positional relationship of a viewer relative to the visual content in the 3D environment, wherein the positional relationship comprises the viewer being located outside of a shape associated with the visual content;
      determining an audio mode based on the positional relationship, wherein the audio mode is a multi-channel audio mode, wherein the multi-channel audio mode is selected based on the viewer being located outside of the shape; and
   presenting audio content with the visual content according to the audio mode.

6. A method comprising:
   at a device having a processor:
      determining a position in a three-dimensional (3D) environment to display visual content;
      determining a positional relationship of a viewer relative to the visual content in the 3D environment, wherein the positional relationship comprises the viewer being located within a shape associated with the visual content;
      determining an audio mode based on the positional relationship, wherein the audio mode is a spatialized audio mode, wherein the spatialized audio mode is selected based on the viewer being located within the shape; and
   presenting audio content with the visual content according to the audio mode.

7. A method comprising:
   at a device having a processor:
      determining a position in a three-dimensional (3D) environment to display visual content;
      determining a positional relationship of a viewer relative to the visual content in the 3D environment;
      determining an audio mode based on the positional relationship;
      presenting audio content with the visual content according to the audio mode; and
      increasing audio spatialization based on detecting the viewer approaching the visual content.

8. A system comprising:

a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising:

determining a position in a three-dimensional (3D) environment to display visual content;

determining a positional relationship of a viewer relative to the visual content in the 3D environment, wherein the positional relationship comprises a distance of the viewer from the visual content;

determining an audio mode based on the positional relationship, wherein the audio mode is a single point source audio mode and wherein the single point source audio mode is selected based on the distance exceeding a threshold; and presenting audio content with the visual content according to the audio mode.

9. A non-transitory computer-readable storage medium storing program instructions executable on a device to perform operations comprising:

determining a position in a three-dimensional (3D) environment to display visual content;

determining a positional relationship of a viewer relative to the visual content in the 3D environment, wherein the positional relationship comprises a distance of the viewer from the visual content;

determining an audio mode based on the positional relationship, wherein the audio mode is a single point source audio mode and wherein the single point source audio mode is selected based on the distance exceeding a threshold; and presenting audio content with the visual content according to the audio mode.

* * * * *